United States Patent
Baratin et al.

(10) Patent No.: US 12,179,562 B2
(45) Date of Patent: Dec. 31, 2024

(54) FLUSH WINDOW MODULE FOR A VEHICLE AND METHOD FOR MOUNTING SAME

(71) Applicant: Hutchinson, Paris (FR)

(72) Inventors: Sylvain Baratin, Corquilleroy (FR); Cyril Lajoux, Vimory (FR)

(73) Assignee: Hutchinson, Paris (FR)

( * ) Notice: Subject to any disclaimer, the term of this patent is extended or adjusted under 35 U.S.C. 154(b) by 211 days.

(21) Appl. No.: 17/619,658

(22) PCT Filed: Jun. 12, 2020

(86) PCT No.: PCT/EP2020/066272
§ 371 (c)(1),
(2) Date: Dec. 16, 2021

(87) PCT Pub. No.: WO2020/254201
PCT Pub. Date: Dec. 24, 2020

(65) Prior Publication Data
US 2022/0355654 A1 Nov. 10, 2022

(30) Foreign Application Priority Data
Jun. 17, 2019 (FR) ...................................... 1906486

(51) Int. Cl.
*B60J 10/79* (2016.01)
*B60J 1/10* (2006.01)
(Continued)

(52) U.S. Cl.
CPC ................. *B60J 10/79* (2016.02); *B60J 1/10* (2013.01); *B60J 1/17* (2013.01); *B60R 13/0206* (2013.01); *B60R 13/0243* (2013.01); *B62D 65/06* (2013.01)

(58) Field of Classification Search
CPC ......... E05D 15/165; B60J 10/79; B60J 10/76; B60J 10/78; B60J 10/74; B60J 10/75
See application file for complete search history.

(56) References Cited

U.S. PATENT DOCUMENTS 4,653,230 A * 3/1987 Seo ........................... B60J 10/79
49/374
10,167,659 B2 * 1/2019 Sagisaka ............... E05D 15/165
(Continued)

FOREIGN PATENT DOCUMENTS

| DE | 102014005721 B3 * | 8/2015 | ................ B60J 1/17 |
| FR | 2684051 A1 * | 5/1993 | .............. B60J 10/79 |
| WO | 2014/191812 A1 | 12/2014 | |

OTHER PUBLICATIONS

International Search Report issued in corresponding International Patent Application No. PCT/EP2020/066272 dated Jul. 9, 2020.

*Primary Examiner* — Catherine A Kelly
*Assistant Examiner* — Patrick B. Ponciano
(74) *Attorney, Agent, or Firm* — Morgan, Lewis & Bockius LLP (57) ABSTRACT

A window module (60) for a vehicle, in particular automobile, comprising:
- a fixed window (22) comprising an internal face (22c) and an external face (22d),
- a movable window (14) comprising an internal face (14c) and an external face (14d), edges (14b, 22a) of the windows facing one another and defining a clearance (J) between them, and the external faces (14d, 22d) of the windows being substantially aligned,
- an elongated guide (26) extending along said edges and attached to the internal face (14c) of the movable window (14),
- an elongated upright (62) extending along said edges and attached to the internal face (22c) of the fixed window (22), and (Continued)

a trim element (70) fitted and attached to the upright, this trim element comprising at least one member (72) for retaining the guide in a housing (L) of the upright.

27 Claims, 9 Drawing Sheets

(51) Int. Cl.
    *B60J 1/17*     (2006.01)
    *B60R 13/02*     (2006.01)
    *B62D 65/06*     (2006.01)

(56) References Cited

U.S. PATENT DOCUMENTS

| | | | |
|---|---|---|---|
| 10,843,538 B2* | 11/2020 | Heppner | B60J 5/0463 |
| 10,974,576 B2* | 4/2021 | Choi | B60J 10/79 |
| 11,059,360 B2* | 7/2021 | Guellec | B60J 10/79 |
| 11,639,086 B2* | 5/2023 | Blottiau | B60J 1/007 |
| | | | 49/459 |
| 11,712,953 B2* | 8/2023 | Nolte | B60J 5/0402 |
| | | | 49/490.1 |
| 11,821,247 B2* | 11/2023 | Ishiguro | B60J 10/77 |
| 11,987,103 B2* | 5/2024 | Yuksel | B60J 10/50 |
| 2008/0224501 A1 | 9/2008 | Zimmer et al. | |
| 2017/0129318 A1* | 5/2017 | Uemura | B60J 10/79 |
| 2019/0039442 A1* | 2/2019 | Charge | B60J 1/1861 |
| 2022/0118829 A1* | 4/2022 | Galluccio | B60J 10/76 |
| 2022/0297518 A1* | 9/2022 | Yüksel | F16J 15/3232 |

\* cited by examiner

FLUSH WINDOW MODULE FOR A VEHICLE AND METHOD FOR MOUNTING SAME

TECHNICAL FIELD OF THE INVENTION

The present invention relates to a window module for a vehicle, in particular an automobile, as well as to its mounting method. These windows are advantageously of the "flush" type.

BACKGROUND

The technical background comprises in particular the documents US-A1-2008/224501 and WO-A1-2014/191812.

Figure 1:
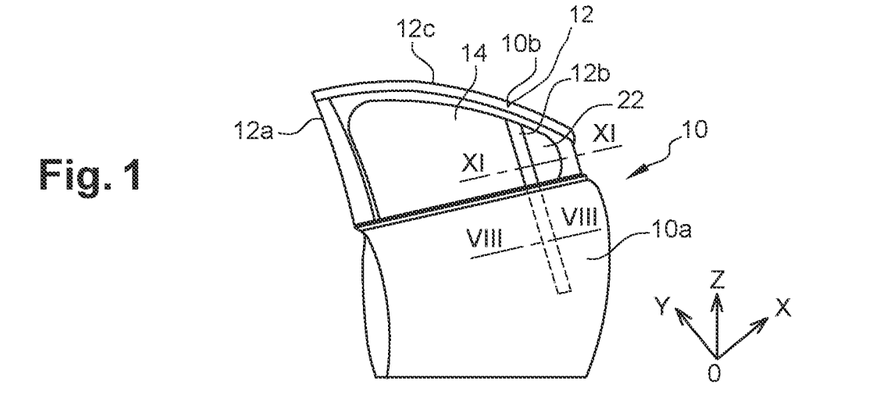
FIG. 1 is a schematic perspective view of a vehicle door.

A vehicle comprises doors, each of which generally comprises a fixed window 22 and a movable window 14. As can be seen in FIG. 1, a door 10 comprises a bottom part or casing 10a and a top part 10b which forms a frame 12 intended to surround the windows 14, 22. The window 22 is fixed and the window 14 can be moved from the frame 12 into the casing 10a and vice versa.

Most of the doors, which are intended to equip standard vehicles, are of the "non-flush" type, i.e. their windows do not have their external faces aligned together.

For a more luxurious range of vehicles, it is known to equip them with "flush" windows. The door is then equipped with a flush window module the external faces of which are aligned. This alignment gives an aesthetic aspect sought after by customers.

In the current technique, the proposed "flush" window technologies are relatively complex to implement and install, and are expensive.

The present invention provides an improvement that is simple, effective and economical.

SUMMARY OF THE INVENTION

The invention provides a window module for a vehicle, in particular an automobile, comprising:
- a fixed window comprising an internal face and an external face,
- a movable window comprising an internal face and an external face, edges of the windows facing one another and defining a clearance between them, and the external faces of the windows being substantially aligned,
- an elongated guide extending along said edges and attached to the internal face of the movable window,
- an elongated upright extending along said edges and attached to the internal face of the fixed window, this upright having in cross-section a general U or L shape, one lateral branch of which extends along and facing said clearance, the upright comprising an internal face and an external face which at least partly defines a housing extending along said edges and intended to receive at least one part of the guide,
- characterized in that a trim element is fitted and attached to said internal face of the upright, this trim element having an elongated shape and extending along the upright, this trim element comprising at least one retaining member which projects from said external face of the upright and which comprises a face for retaining said part of the guide in said housing, in a direction substantially perpendicular to a plane which is perpendicular to the internal faces of the windows and which passes through said clearance.

The invention thus proposes to retain the guide in the housing of the upright by means of a trim element fitted to the upright. The trim element is mounted on the internal face of the upright, i.e. from the interior of the vehicle or its passenger compartment.

In the present application, "internal", "interior", etc. means elements located in the vehicle or oriented towards the interior of the vehicle. The terms "external", "exterior", etc., therefore means elements located outside the vehicle or oriented towards the exterior.

In particular, the invention allows to simplify the mounting of the module. In fact, when the window equipped with the guide is mounted in the casing of a door and the guide is engaged in the housing of the upright, the trim element is not yet mounted and its retaining member does not interfere with this mounting. Once in place, the trim element is mounted on the upright, which can allow to ensure both the positioning of the guide and therefore the window, and the locking of the assembly. Advantageously, the trim element has a neat interior finish visible from the vehicle interior and can therefore contribute to the aesthetics of the passenger compartment.

The windows are "flush". Preferably, the external faces of the windows are also aligned with external faces of adjacent elements and in particular one or more elements arranged between these windows. This is the case, for example, with a profile, a seal, a sealing lip, etc., which is inserted between the edges facing the windows.

The module according to the invention may comprise one or more of the following characteristics, taken alone or in combination with each other:
- the trim element comprises a plurality of retaining members distributed along at least one part of the trim element;
- said at least one retaining member passes through an opening of said upright.
- said at least one retaining member bears on an edge of said upright that extends along the edges of the windows;
- said trim element comprises at least one hooking tooth on said upright;
- said at least one retaining member comprises a hooking tooth, which preferably bears on said external face of the upright;
- said retaining face bears directly on said part of the guide;
- said at least one member passes through an orifice of a slide joint engaged at least partly in said housing and itself defining a space for receiving said part of the guide;
- said retaining face bears on said part of the guide by means of a wall of a slide joint engaged at least partly in said housing and itself defining a space for receiving this part of the guide;
- said at least one member is engaged in a groove of the slide joint.
- the slide joint has a U-shaped part comprising two ascending strands connected by an upper strand, said groove extending along substantially the entire length of one of the ascending strands;
- the groove has a U, V or trapezoidal cross-section;
- the slide joint or the upright comprises at least one lip located at the level of said clearance and bearing on said edges of the windows and/or
- the slide joint or the upright comprises at least one lip bearing on the internal face of the movable window and/or on the internal face of the portion of the guide;
- the guide comprises at least one internal leg on which the retaining face is intended to bear directly or indirectly;

the guide comprises two internal legs aligned and spaced apart from each other and on which the retaining face is intended to bear directly or indirectly;

the upright extends longitudinally beyond the edge of the fixed window and comprises a part intended to be housed in a door casing, this part not being intended to be covered by said trim element;

said part comprises at least one leg for attachment to the casing;

said part comprises an external face on which are located protruding retaining members configured to cooperate with said part of the guide and/or a slide joint.

The present invention also relates to a vehicle, in particular an automobile, comprising at least one module as described above.

The present invention also relates to a method for mounting a module as described above, wherein it comprises the steps of:

a) mounting the movable window next to the fixed window, and inserting said part of the guide into the housing of the upright, and b) mounting the trim element on the upright so that the retaining face of said at least one member engages directly or indirectly with the part of the guide. The method according to the invention may comprise one or more of the following steps, and also characteristics of the above module, taken in isolation from each other or in combination with each other:

the method comprises, between the steps a) and b), a step i) of mounting a slide joint in the housing of the upright, the part of the guide being engaged in a space for receiving the slide joint during the step b);

the part of the guide bears and deforms the slide joint during the step i);

the part of the guide is inserted by means of a local or reversible elastic deformation of the slide joint during the step i)

the upright comprises a part receiving a part of the slide joint and the trim element, and another part receiving another part of the slide joint and intended to extend into a door casing;

the trim element is attached to the upright by means of an elastic snap-fit;

the upright and the trim element are at least partly made of plastic material; although it would be feasible to make an upright and a trim element in one piece, in particular when they are made of the same material, this aspect is not part of the invention because the mounting of a guide in such an assembly would be too complex or even impossible to achieve in practice.

BRIEF DESCRIPTION OF FIGURES

The invention will be better understood and other details, characteristics and advantages of the present invention will become clearer from the following description made by way of non-limiting example and with reference to the attached drawings, in which.

DETAILED DESCRIPTION OF THE INVENTION

In the following description and with reference to the drawings, a three-dimensional reference frame is used in which the axis X is horizontal and oriented in the direction of displacement of the vehicle, the axis Y is horizontal and oriented towards the interior of the vehicle, and the axis Z is vertical and oriented upwards. The terms "front" and "rear" refer to the front and rear of the vehicle with respect to the axis X. The terms "interior" and "exterior" refer to the inside and the outside of the vehicle with respect to the axis Y. Finally, the terms "lower" or "bottom" and "exterior" or "upper" refer to the bottom or top of the vehicle with respect to the axis Z.

Figure 2:
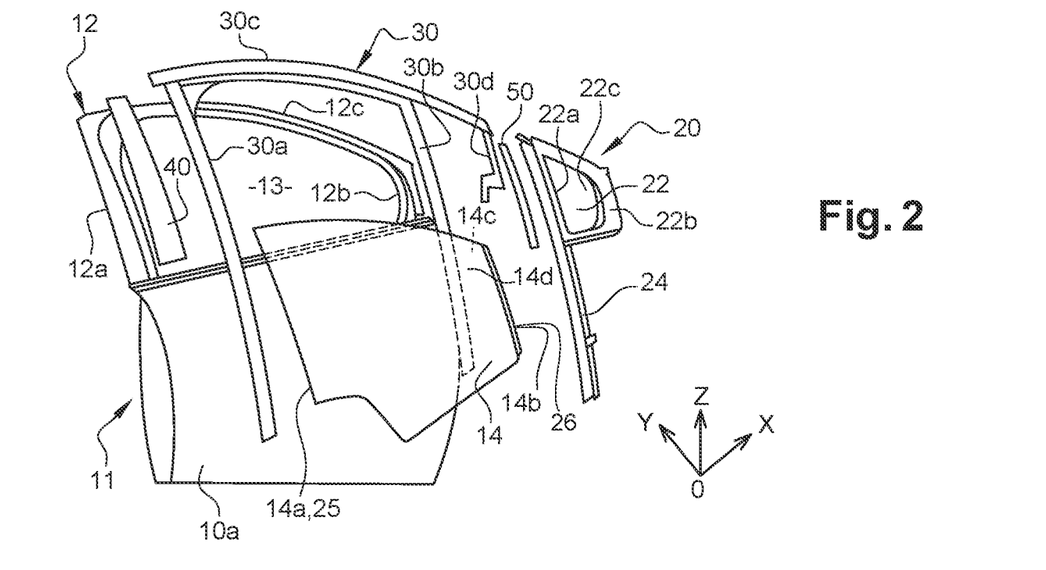
FIG. 2 is a partial schematic exploded perspective view of the door of FIG. 1.
Figure 3:
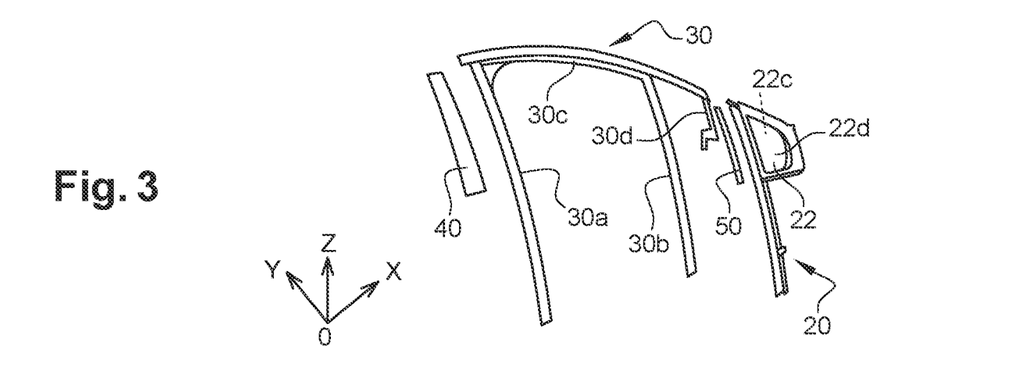
FIG. 3 is a schematic perspective view of some of the elements of the door of FIG. 1.

FIGS. 1 to 3 show a door 10 of a vehicle, which comprises a rack 11, a module 20 with fixed and movable windows, a slide joint 30, and trim elements 40, 50. In the illustrated example, the door 10 is a front door of vehicle.

The rack 11 comprises a lower part or casing 10a and an upper frame 12 defining an opening 13, this upper frame comprising two ascending uprights, respectively rear 12a and front 12b, connected by an upper rail 12c.

The module 20 comprises a fixed window 22 and a movable window 14.

The fixed window 22 is mounted in a part, here front, of the opening 13, and is integral with a rising upright 24 extending along a rising edge, here rear 22a, of the fixed window 22 and extending along the opening 13 and below a body belt line in the rack. It therefore extends at least partly into the casing 10a of the rack 11. The fixed window 22 comprises a front ascending edge 22b extending along the front upright 12b. The internal and external faces of the window 22 are designated 22c and 22d respectively.

The movable window 14 is adapted to close the rest of the opening 13, behind the fixed window 22. The window 14 comprises two rising edges, rear 14a and front 14b respectively, along which guides 25, 26 are attached. Each guide 25, 26 has an elongated shape and is attached by any suitable technique and for example by gluing to an internal face 14c of the window 14. The external face of the window 14 is designated 14d.

The slide joint 30 is generally inverted U-shaped and comprises two ascending strands, rear 30a and front 30b respectively, connected by an upper strand 30c. The rear strand 30a extends along the rear upright 12a, and the front strand 30b extends along the upright 24. The upper strand 30c extends forward and is connected at its forward end to an additional ascending strand 30d. The extension of the strand 30c extends along the upper edge 22e of the window 22 and a front part of the upper rail 12c. The additional strand 30d extends along the front edge 22b of the fixed window 22 and the front upright 12b.

A first, rear, external trim element 40 is fitted to the rear strand 30a and attached to the rear upright 12a. A second external front trim element 50 is fitted to the front strand 30b and attached to the upright 24.

The invention provides a flush window module 60 and a vehicle door 10 comprising such a module. A flush window module 60 in the sense of the invention is a module in which the fixed 22 and movable 14 window have their external faces 22d, 14d which are substantially aligned.

FIGS. 4 to 15 represent a first embodiment of the invention.

Figure 11:
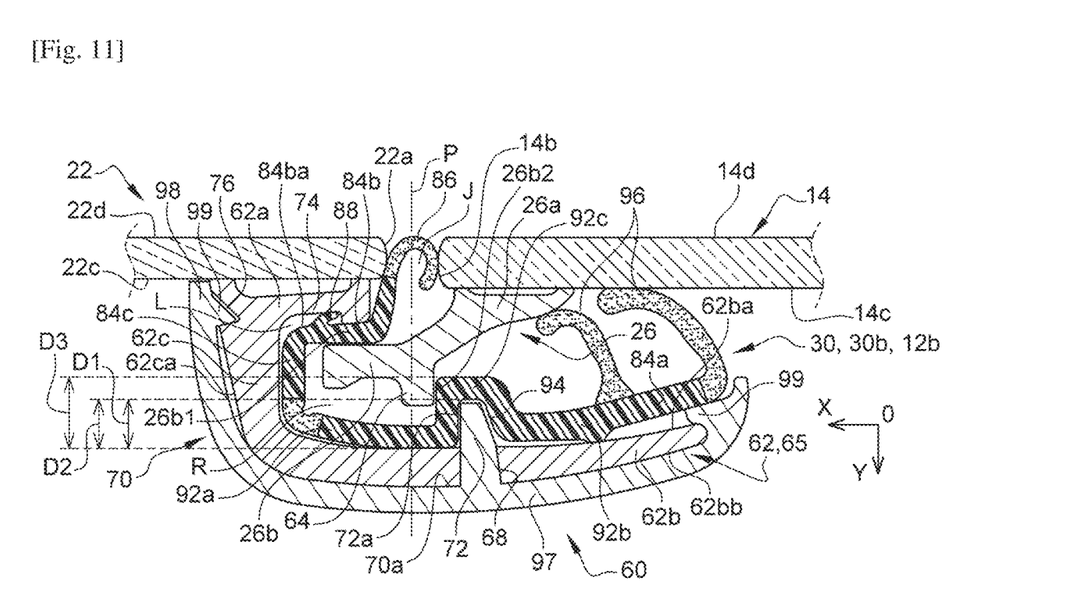
FIG. 11 is a schematic cross-sectional view of the module of FIG. 8, the section being made at the level of the fixed window.

The module 60 is shown in cross-section in FIG. 11, this view corresponding to the section line XI-XI of FIG. 1 which is located at the level of the frame 12 of the door. The module 60 is shown in cross-section in FIG. 8, this view corresponding to the section line VIII-VIII of FIG. 14 which is located in the casing 20a.

In addition to the windows 14, 22, the illustrated example of the module 60 comprises:
- at least one elongated guide 26 extending along the front ascending edge 14b of the movable window 14, and attached to its internal face 14c,
- an elongated upright 62 extending along the rear ascending edge 22a of the fixed window 22, and attached to its internal face 22c.

Figure 8:
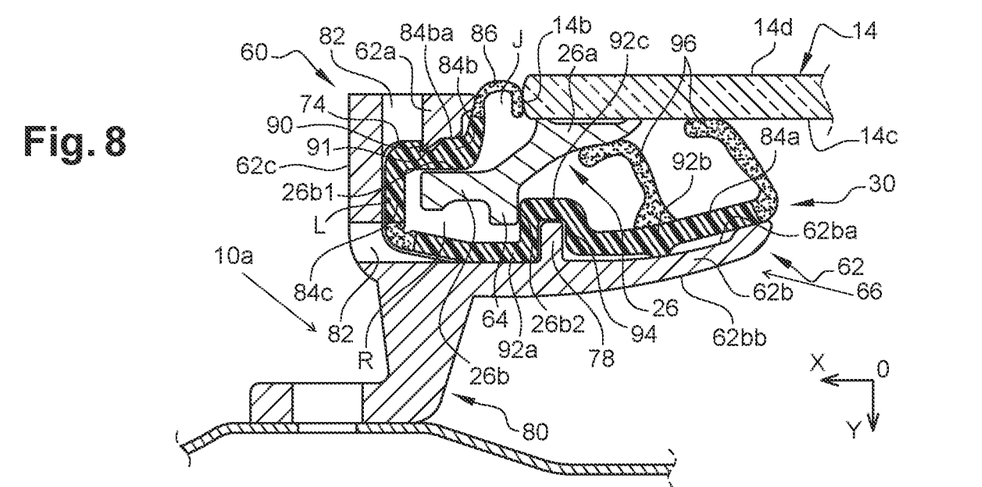
FIG. 8 is a schematic cross-sectional view of a module according to the embodiment of FIG. 4, the cross-section being carried out in a door casing.

The guide 26 can be seen in FIGS. 8 and 11 in particular. It comprises two parts, referred to as an attachment part 26a and an extension part 26b. The attachment part 26a comprises a bearing and attachment surface on the internal face 14c. The attachment can be carried out by any suitable means, for example by gluing. The glue can be partly housed in recesses in this surface.

The extension part 26b extends from the side of the fixed window 22 and comprises an external surface 26b1 and a bearing surface 26b2 which is oriented along the axis X toward the rear.

To facilitate the guiding of the window 14, while facilitating its mounting and optimizing its mass, the guide 26 may comprise legs 64 oriented along the axis Y towards the interior. These legs 64 allow the bearing surface 26b2 to be extended locally towards the interior of the vehicle. These legs 64 are, for example, two in number and are located respectively in the vicinity of the longitudinal ends of the guide 26.

Figure 5:
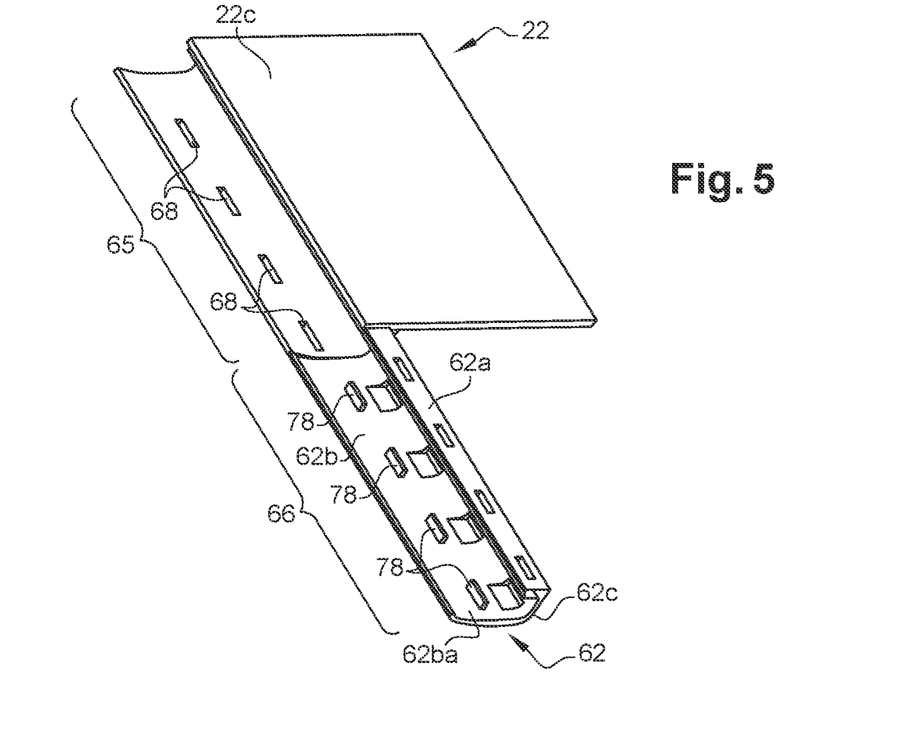
FIG. 5 is a schematic perspective view of the fixed window and the upright of FIG. 4.
Figure 6:
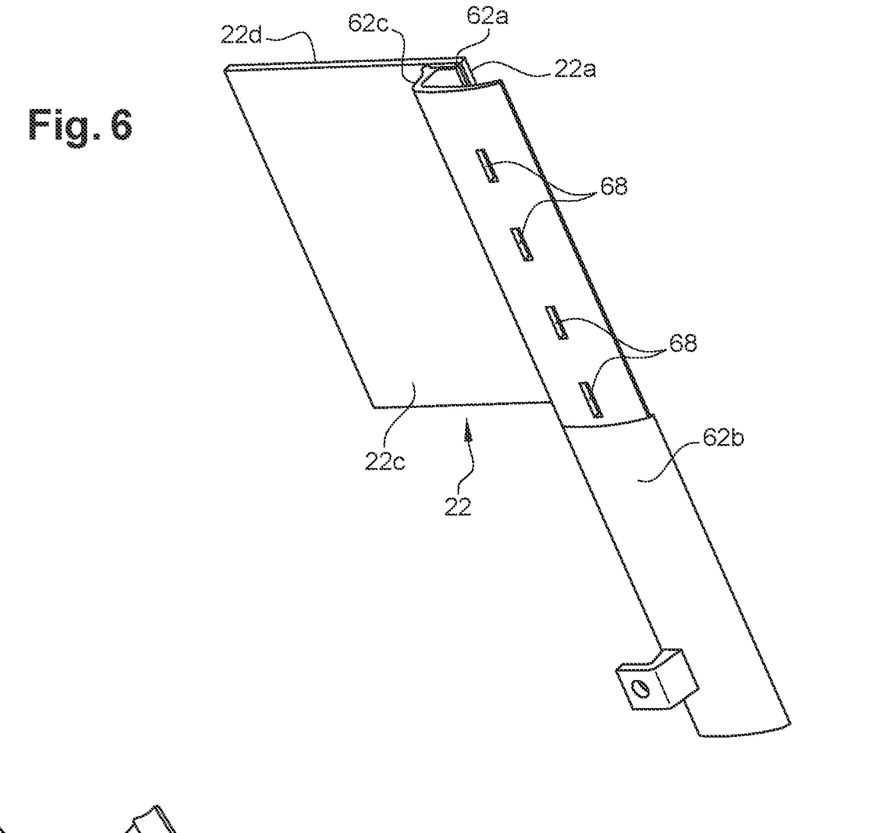
FIG. 6 is another schematic perspective view of the fixed window and upright of FIG. 4.
Figure 9:
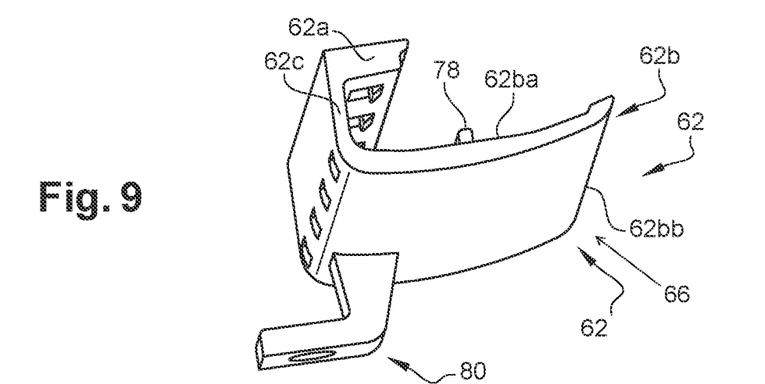
FIG. 9 is a schematic perspective view of a portion of the upright of the module of FIG. 8.
Figure 10:
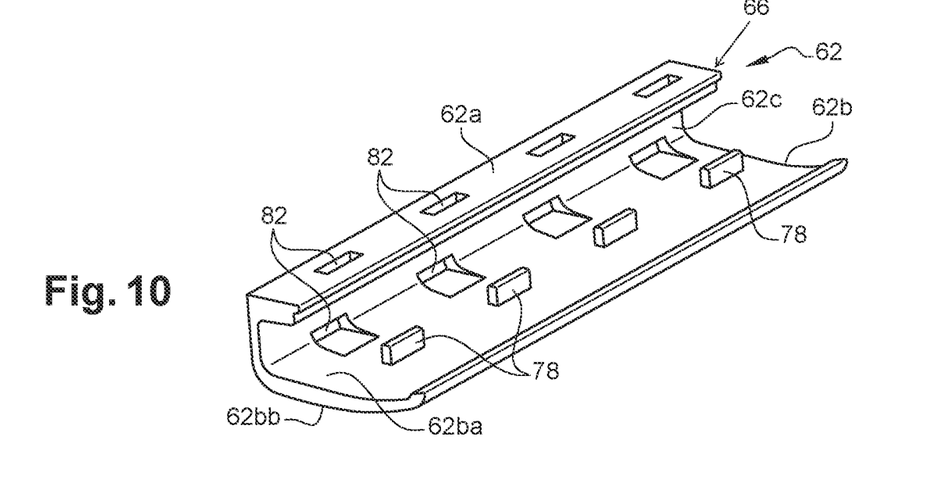
FIG. 10 is another schematic perspective view of a portion of the upright of the module of FIG. 8.

The upright 62 can be seen in particular in FIGS. 5 and 6. It is generally U- or L-shaped in cross-section and comprises two side branches 62a, 62b connected to each other by a median wall 62c. The branches 62a, 62b and the wall 62c define a housing L therebetween. The upright 62 further comprises two longitudinal parts, namely a first part or upper part 65 which extends along the rear ascending edge 22a of the window 22 at the level of the frame 12 of the door 10 (FIGS. 5, 6 and 11), and a second part or lower part 66 which extends inside the casing 10a of the door 10 (FIGS. 8-10). The upper part 65 of the upright 62 is attached to the fixed window 22, on its internal face 22c, by means of the external branch 62a. The external branch 62a extends substantially parallel to the internal face 14c. This external branch 62a comprises a surface for bearing and attaching to the internal face 22c. The attachment can be carried out by any appropriate means, for example by gluing, or by adhesion via a TPE material injected during the encapsulation of the upright with the window (which has preferably been locally primed beforehand). In the case of a gluing, the glue can be partly housed in recesses of this surface.

The median wall 62c extends perpendicularly to the windows 14, 22, towards the interior of the vehicle. The internal branch 62b extends from the fixed window 22 on the side of the movable window 14, parallel to the internal faces 14c, 22c of the windows. It extends here opposite a part of the internal face 14c of the movable window 14 as well as a clearance J extending between the edges 14b, 22a facing the windows (FIG. 11).

The branch 62b comprises openings 68 for the passage of retaining members 72 carried by a trim element 70. These openings 68 are regularly spaced along the axis Z and are for example four in number (FIGS. 5 and 6). Each of these openings 68 has, for example, a generally rectangular shape. As can be seen in the drawings, the openings 68 are preferably located, and only located, on the part 65 of the upright 62 (FIG. 5).

The internal branch 62a may comprise an inwardly opening longitudinal groove 74 (FIGS. 8 and 11). The median wall 62c may comprise a longitudinal notch or groove 76 opening along the axis X, on the side opposite the housing L, in particular along the part 65 (FIG. 11).

The lower part 66 of the upright 62 comprises retaining members 78 which project from the external face 62ba of its outer branch 62b. These members 78 are located, for example, in place of the aforementioned openings 68. These members 78 are evenly spaced along the axis Z and are for example four in number (FIGS. 8-10). Each of such members 78 has, for example, a generally parallelepipedal shape.

This external branch 62a comprises on its internal face 62bb an attachment leg or flange 80 in the interior of the casing 10a of the door 10. The flange 80 is generally L-shaped and is formed in one piece with the upright 62 (FIGS. 8 and 9). This upright is for example made of PP (or PA) with glass fibres. In addition, the median wall 62c and the external branch 62a may comprise holes 82 resulting from the manufacturing mode of these parts, in particular by molding.

In a manner known to a person skilled in the art, the manufacture of this type of part by molding may require the use of trays intended to define the molding areas and surfaces of the part. The holes 82 may result from the use of these trays, of which there are eight in the example shown (see FIGS. 4, 5 and 10).

A first series of trays are intended to be moved in translation along the axis X, through the holes 82 in the median wall 62c. A second series of trays are intended to be moved in translation along the axis Y, through the holes 82 of the external branch 62a.

As can be seen in FIGS. 8 and 11, a slide joint 30 of the type described with reference to FIGS. 1 to 3 is used with the present invention.

The joint 30 is mounted in the housing L and itself defines a space R for receiving the guide 26, and in particular its extension part 26b.

In cross-section, the joint 30 is generally U-shaped and also comprises two branches, respectively internal 84a and external 84b, connected to each other by a median wall 84c.

The external branch 84b extends over and into the external branch 62a of the upright 62 and is connected at its longitudinal edge located on the side of the movable window 14 to a longitudinal lip 86. This lip 86 occupies at least a part of the clearance J between the edges 14b, 22a facing the windows 14, 22, and bears on these edges to ensure a seal across the clearance J. On the opposite side, the external branch 84b is connected to the median wall 84c which extends along and on the median wall 62c of the upright 62.

The internal branch 84a extends over and outside the internal branch 62b of the upright 62.

In the upper part 65 of the upright 62, the external face 84ba of the branch 84b comprises a longitudinal protrusion 88 which is engaged in the groove 74 of the external branch 62a with a view to limiting the displacements of the branch 84b along the axis X.

In the lower part 66 of the upright 62, the external face 84ba of the branch 84b comprises a groove or notches 90 for receiving lugs 91 of the external branch 62a with a view to limiting the displacements of the branch 84b along the axis X.

The internal branch 84a of the joint 30 comprises two longitudinal parts, respectively front 92a and rear 92b, connected to each other by a part 92c with a U, C or V cross section. This section is U-shaped in the example shown. The parts 92a, 92b extend over and along the external face 62ba of the internal branch 62b. The U-shaped part 92c protrudes from this face 62ba and defines a longitudinal groove 94 that opens towards the interior. This groove 94 extends along the entire length of the rising strand 30b of the slide joint 30, which can be easily carried out by extrusion for example.

The internal branch 84a is further connected, on the side opposite the median wall 84c, to one or more sealing lips 96 which bear on the internal face 14c of the movable window 14 and/or on the internal face of the part 26a of the guide 26.

Figure 4:
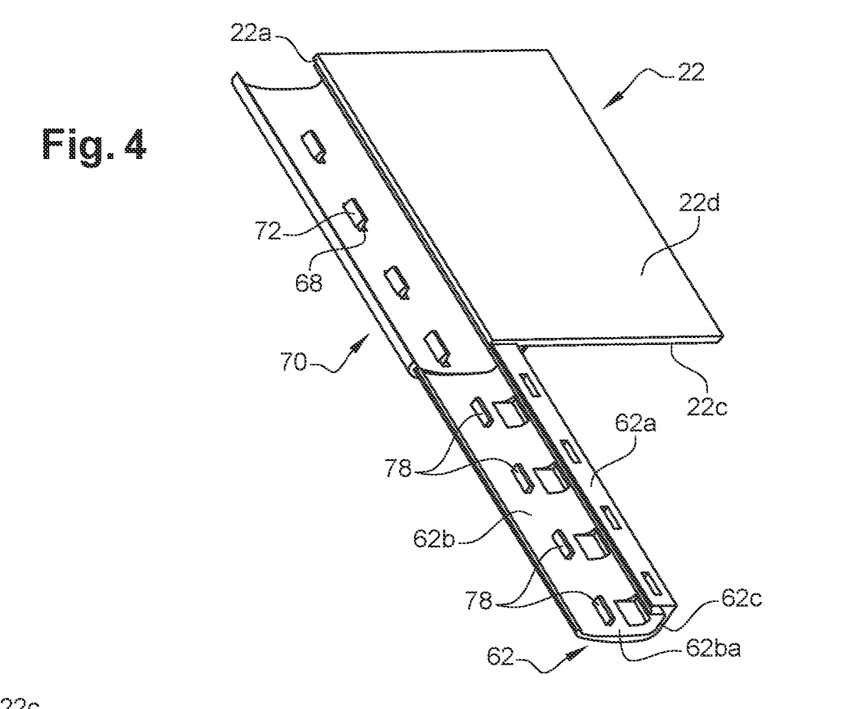
FIG. 4 is a schematic perspective view of a fixed window, an upright and a trim element fora module according to an embodiment of the invention.
Figure 7:
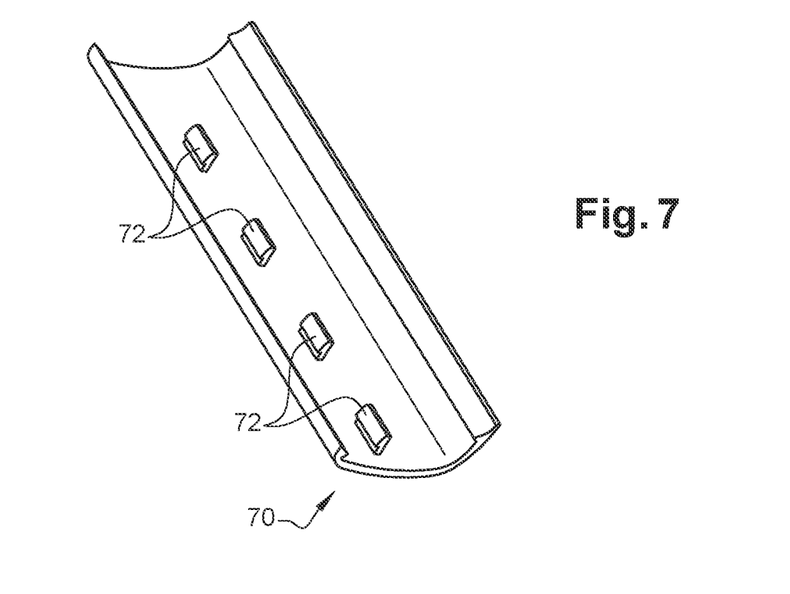
FIG. 7 is a schematic perspective view of the trim element of FIG. 4.

The trim element 70 can be seen in FIGS. 4 and 7 in particular. In contrast to the example of FIGS. 1 to 3, this trim element 70 is here mounted from the interior of the vehicle, on the upright 62.

In the illustrated example, the trim element 70 is intended to cover the internal face 62bb of the internal branch 62b as well as the face 62ca of the median wall 62c, which connects this external face 62ba to the internal face 22c of the fixed window 22.

The trim element 70 is also fitted and attached to the upper part 65 only of the upright 62. The lower portion 66 of this upright 62 is located in the interior of the casing 10a of the door 10 and does not need to receive a part of the trim element 70.

The trim element 70 is formed in one piece and is shown alone in FIG. 7. Here it is generally L-shaped in section and comprises two substantially perpendicular walls 97, 98. One wall thereof, referenced 97, covers the internal face 62bb of the internal branch 62b, and the other wall thereof, referenced 98, covers the aforementioned face 62ca of the median wall 62c. Here, the trim element 70 is attached to the upright 62 by elastic snap-fit and comprises hooking tooth 99 for this purpose.

As can be seen in FIG. 11, the trim element 70 comprises a first hooking tooth 99 at its longitudinal edge located on the side of the free longitudinal edge of the upright 62. This hooking tooth 99 bears on this free edge of the upright, along the axis X, or even along the axis Y towards the interior.

The trim element 70 comprises a second hooking tooth 99 at its opposite longitudinal edge. This hooking tooth 99 is engaged in the aforementioned groove 76 of the median wall 62c of the upright 62.

Finally, the trim element 70 comprises on an external face 70a, i.e. on its surface facing the internal face 62ba of the branch 62b of the upright 62, the projecting retaining members 72 which have the function of cooperating with the guide 26 with a view to holding it in position.

In the example shown, this cooperation is indirect. The members 72, here four in number, are evenly spaced along the trim element 70 and are generally parallelepipedal in shape. The free end or the top of each of these members 72 may be rounded or beveled. This shape is preferably complementary to that of the groove 94 defined by the U-shaped part 92c of the slide joint 30, as in the example shown.

The members 72 pass through appropriately shaped and sized openings 68 in the upright 62 and are received in the groove 94 of the slide joint 30. As can be seen in FIG. 11, the members 72 project from the external face 62ba of the upright 62 by a distance D1. The U-shaped part 92c of the slide joint 30 extends around these members 72 and define a projecting distance or height D2 in relation to the external face 62ba of the upright 62. The difference in distance D2–D1 substantially corresponds to the wall thickness of the U-shaped part 92c of the slide joint 30, and more particularly its bottom wall.

In the mounted position, the extension part 26b of the guide 26 is located at a distance D3 from the external face 62ba of the internal branch 62a. This distance is measured between this face 62ba and the free end of the legs 64 of the guide 26. The distance D3 is less than D2 so that the guide 26 can come to bear by its bearing surface 26b2 on the members 72 or at least the U-shaped part 92c of the joint 30 mounted on these members 72. The distance D3 may be less than, equal to or greater than D1.

Figure 12:
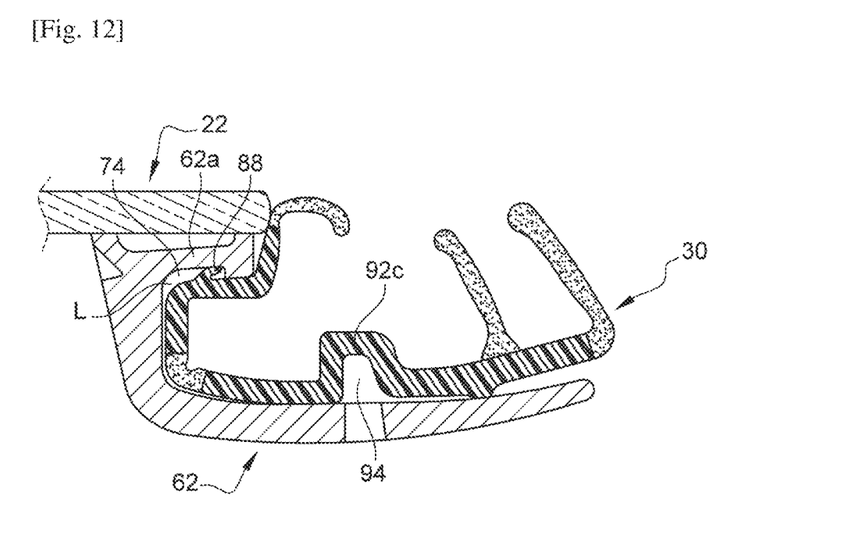
FIG. 12 is a schematic cross-sectional view similar to that of FIG. 11 and illustrating a step of a mounting method according to the invention.
Figure 13:
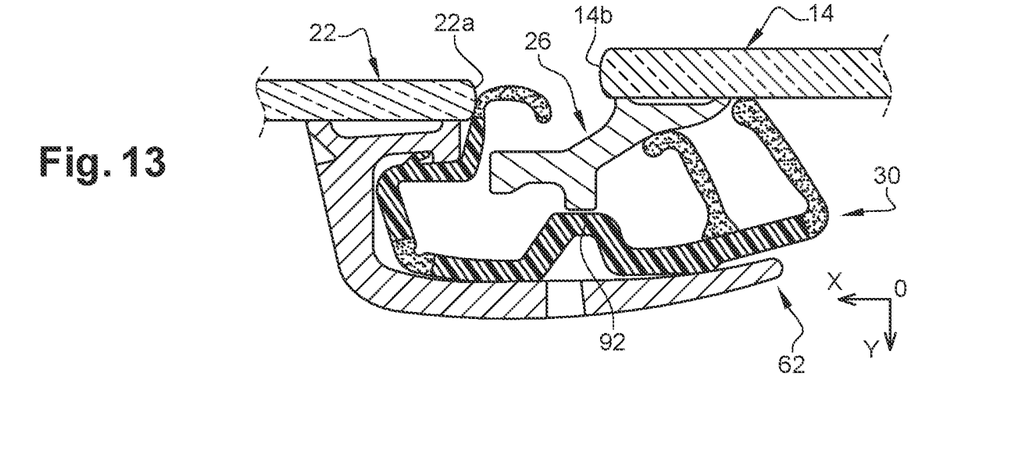
FIG. 13 is a schematic cross-sectional view similar to that of FIG. 11 and illustrating another step of the mounting method according to the invention.
Figure 14:
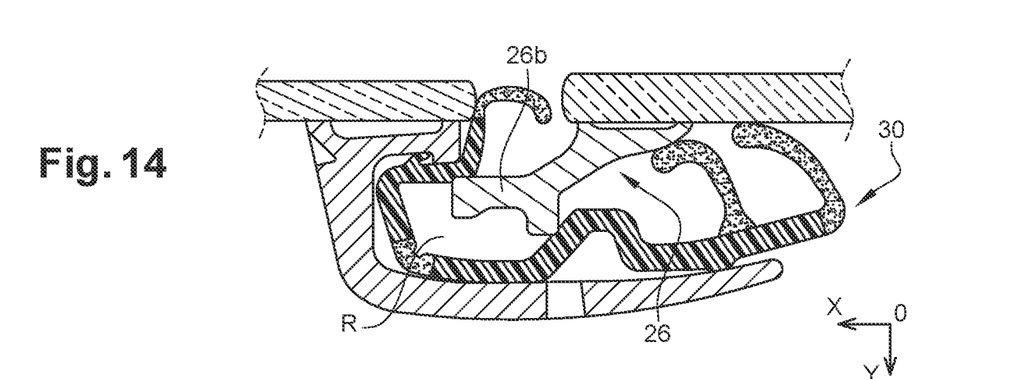
FIG. 14 is a schematic cross-sectional view similar to that of FIG. 11 and illustrating another step of the mounting method according to the invention.
Figure 15:
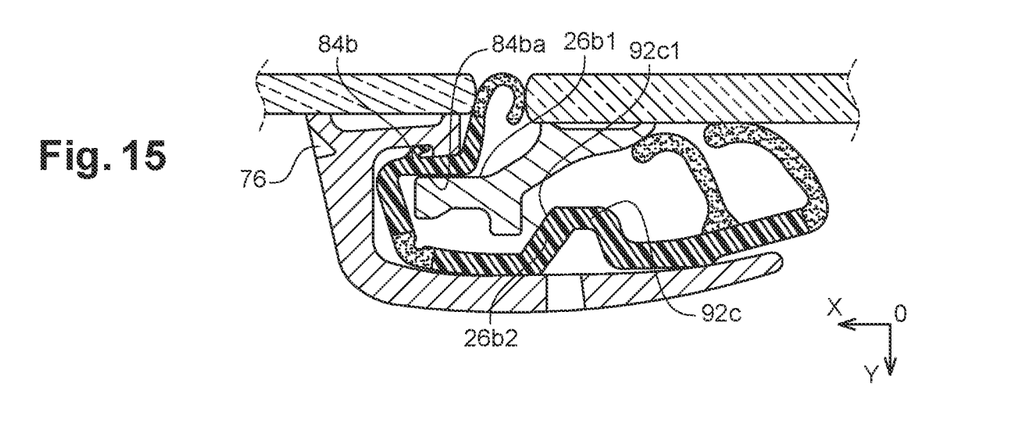
FIG. 15 is a schematic cross-sectional view similar to that of FIG. 11 and illustrating another step of the mounting method according to the invention.

Reference is now made to FIGS. 12 to 15 which illustrate steps for mounting a module 62 according to the invention. The slide joint 30 is preferably made of a flexible elastomeric material and is mounted first in the housing L defined by the upright 62 (FIG. 12). It is installed in the upper part 65 of the upright 62 so that its protrusions 88 are engaged in the groove 74 of the external branch 62a of the upright 62, and in the lower part 66 of the upright 62 so that its notch 90 receives the lugs 91 of this external branch 62a (FIG. 8). In addition, the groove 94 of the U-shaped part 92c receives the retaining members 72 of the lower part 66 of the upright 62 (FIG. 8). The mounting of the lower part of the slide joint 30 in the casing 10a of the door 10 can be carried out either by a movement in a Z direction and then in an X-Y direction via the openings in the inner wall of the casing, or virtually blindly by insertion in a Z direction. However, this second mounting mode is simplified by the fact that the mounting operator can slide the ascending strand 30a of the joint along the axis Z inside the housing L of the upright 62, so that the members 78 and the lugs 91 slide respectively in the groove 94 and the notch 90. The movable window 14 equipped with the guide 26 is then mounted in the door 10 and slid into the door casing 10a, as shown in FIGS. 13 to 15. For this purpose, it is presented so as to bring its edge 14b closer to the edge 22a of the fixed window 22. For example, this can be done by a first translation of the window 14 along the axis Y, towards the interior of the vehicle (FIG. 13), then a second translation of the window 14 along the axis X, towards the window 22 (FIGS. 14 and 15). During the first translation, the guide 26 may bear on the U-shaped part 92c of the joint 30 and elastically deform it. During the second translation, the extension part 26b of the guide 26 penetrates into the reception space R defined by the joint 30 and can bear both, on account of its surface 26b1 with the internal face 84ba of the external branch 84b of the joint 30, and on account of its bearing surface 26b2 on the front lateral face 92c1 of the U-shaped part 92c. The trim element 70 is then fitted and attached to the upright 62. Its hooking tooth 99 is first engaged on the free edge of the upright 62 and then its retaining members 72 are engaged in the openings 68 of the upright 62 and the groove 94 of the U-shaped part 92c of the joint 30 (FIG. 11). Its other hooking tooth 99 is then engaged in the groove 76 of the upright 62. The latter operation requires an elastic deformation of the trim element 70 which may be permitted by its material, preferably plastic. The trim element can be made of one or two materials for example. The upright 62 may also be made of a plastic material, for example, the same material as the trim element. The assembly of FIG. 11 is then obtained in which the retaining members 72 cooperate indirectly with the guide 26 to ensure that it is held in place in particular along the axis X. The retaining members 72 thus comprise retaining faces 72a of the guide 26 in said housing L, in a direction substantially perpendicular to a plane P which is perpendicular to the internal faces 14c, 22c of the windows 14, 22 and which passes through the clearance J between the edges 14a, 22a of these windows (FIG. 11).

Figure 16:
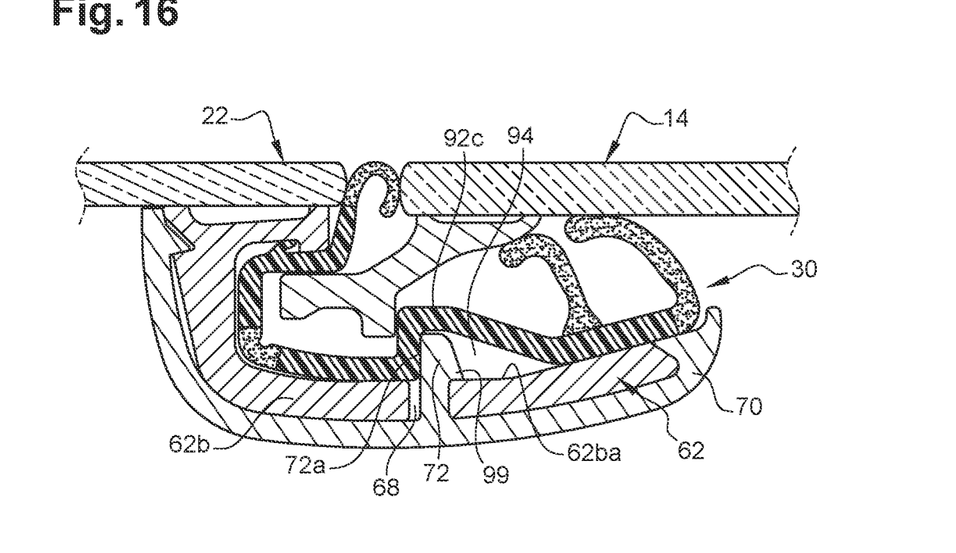
FIG. 16 is a schematic cross-sectional view similar to that of FIG. 11 and illustrating an alternative embodiment of the module according to the invention.
Figure 17:
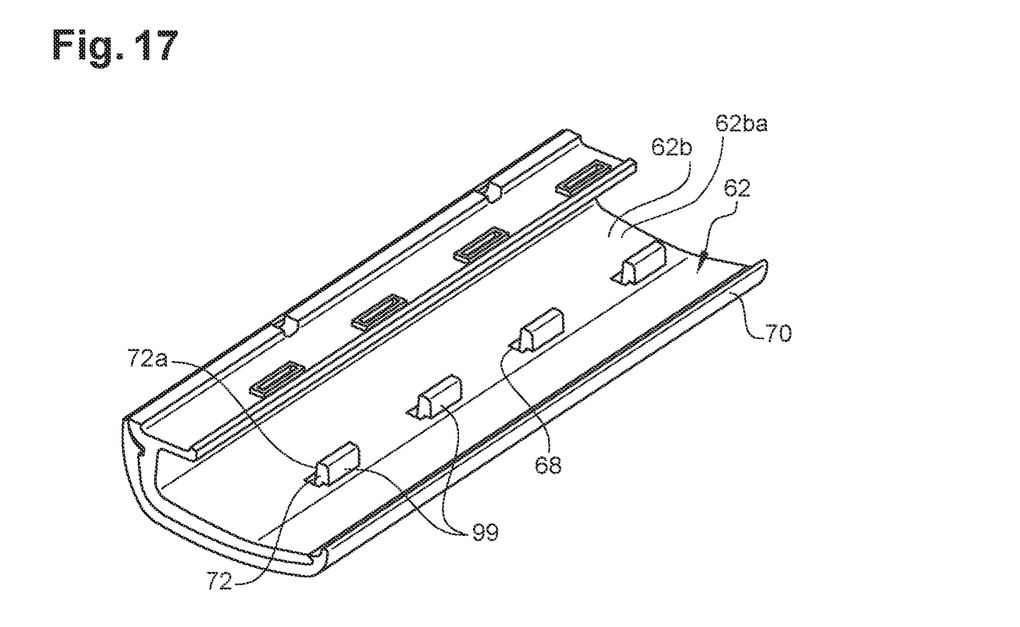
FIG. 17 is a schematic perspective view of the trim element and a part of the upright of the alternative embodiment shown in FIG. 16.

FIGS. 16 and 17 illustrate an alternative embodiment of the invention which differs from the preceding embodiment in particular in that the projecting part 92c of the slide joint 30 has here in cross-section a general V or trapezoidal shape. Furthermore, the retaining members 72 carried by the trim element 70 each comprise a hooking tooth 99.

These teeth 99 are located on the side of the free longitudinal edge of the upright 62, i.e. on the side opposite the retaining faces 72a, and cooperate by bearing with the external face 62ba of the internal branch 62b of the upright 62. These teeth 99 ensure that the trim element 70 is properly attached to the upright 62. Thus, it is possible to maintain larger mounting clearances between the members 72 and the openings 68 of the upright 62, on the one hand, and between the members and the groove 94 of the V-shaped part 92c, on the other hand, thus allowing to facilitate the mounting of these parts.

Figure 18:
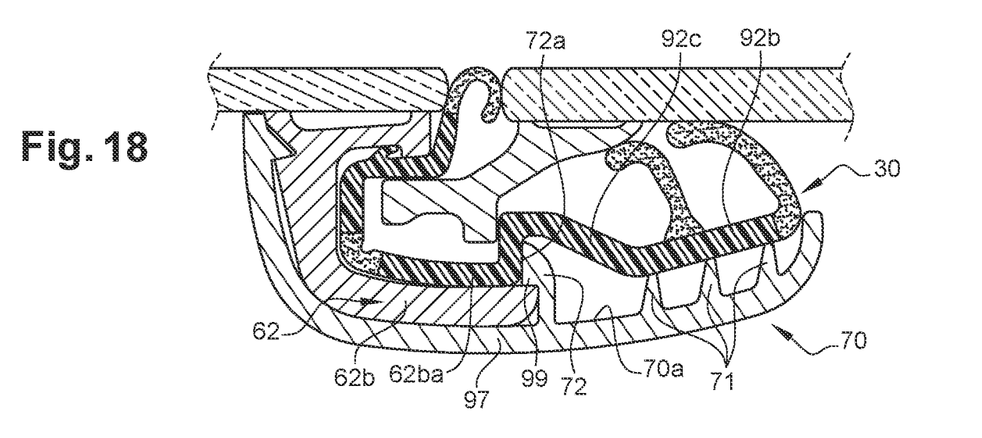
FIG. 18 is a schematic cross-sectional view similar to that of FIG. 11 and illustrating an alternative embodiment of the module according to the invention.
Figure 19:
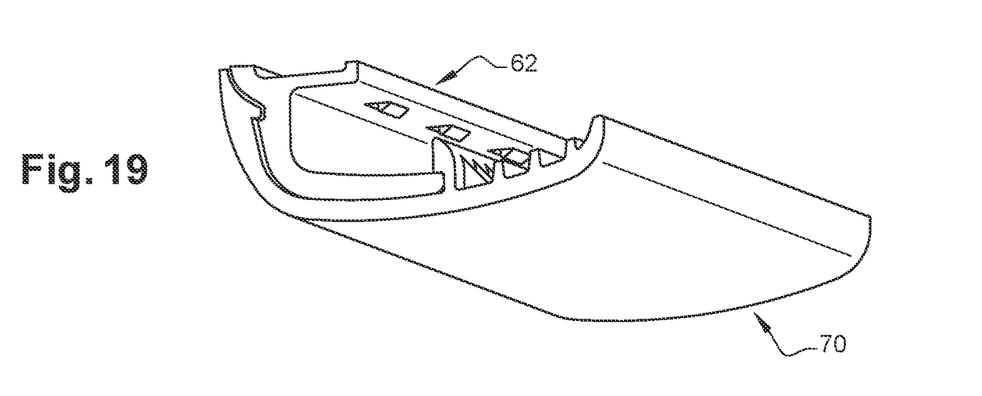
FIG. 19 is a schematic perspective view of the trim element and a part of the upright of the alternative embodiment shown in FIG. 16.
Figure 20:
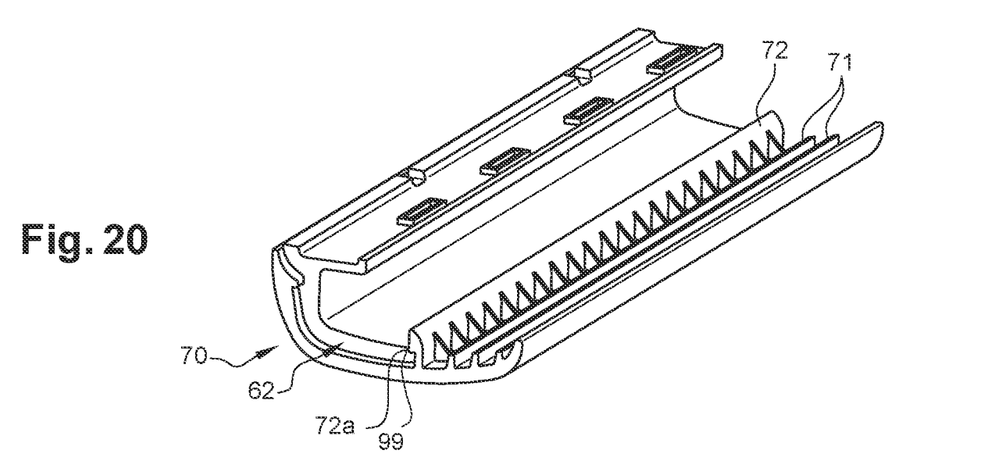
FIG. 20 is another schematic perspective view of the trim element and a part of the upright of the alternative embodiment shown in FIG. 16.

FIGS. 18 to 20 illustrate another alternative embodiment of the invention which differs from the first embodiment in particular in that the projecting part 92c of the slide joint 30 here has a generally V-shaped or trapezoidal cross-section. Furthermore, the retaining members 72 carried by the trim element 70 each comprise a hooking tooth 99. These teeth 99 are located on the side of the retaining faces 72a. These teeth 99 ensure a good attachment of the trim element 70 on the upright 62, by cooperating by bearing with the external face 62ba of the internal branch 62b of the upright 62.

Figure 21:
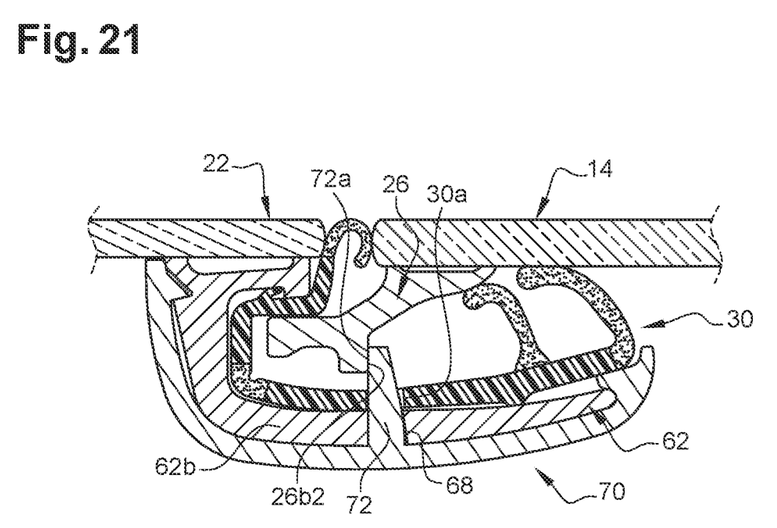
FIG. 21 is a schematic cross-sectional view similar to that of FIG. 11 and illustrating an alternative embodiment of the module according to the invention.

The alternative embodiment of FIG. 21 differs from the first embodiment of the invention in particular in that the retaining member 72 of the trim element 70 passes through openings 68 of the upright 62 but also through orifices 30a of the slide joint 30, which thus does not comprise a U-shaped part 92c. The members 72 comprise retaining faces 72a against which the bearing surface 26b2 of the guide 26 can directly bear.

It can be seen in this embodiment that the members 72 do not pass through openings 68 but bear on the free longitudinal edge of the upright 62. The internal branch 62b of the upright 62 has a dimension along the axis X that is shorter than that of the first embodiment. The trim element 70 and in particular its wall 97 has a dimension along the axis X which is greater than that of the branch 62b, and its internal face 70a comprises longitudinal ribs 71 for supporting the slide joint 30, and in particular its part 92b.

Figure 22:
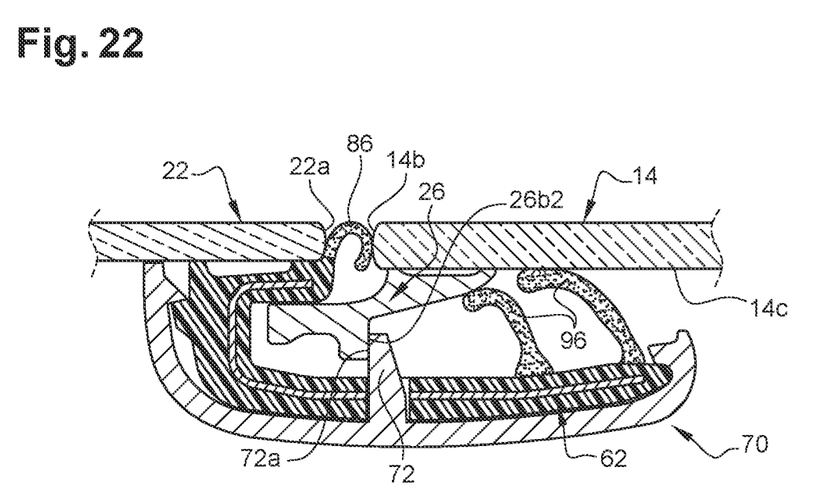
FIG. 22 is a schematic cross-sectional view similar to that of FIG. 11 and illustrating an alternative embodiment of the module according to the invention.

The alternative embodiment of FIG. 22 differs from the first embodiment of the invention in particular in that it does not comprise a slide joint 30, the housing L of the upright 62 itself ensuring guidance and sealing with the guide 26 carried by the movable window 14. The upright 62 may thus comprise the sealing lips 86, 96 cooperating with the edges 14b, 22a facing the windows 14, 22 as well as with the internal face 14c of the movable window 14.

The retaining member 72 of the trim element 70 extends through openings 68 in the upright 62 and comprise retaining faces 72a against which the bearing surface 26b2 of the guide 26 can directly bear.

In another variant of the invention not shown, the trim element 70 could comprise at its longitudinal ends orifices for the passage of screws which would be intended to be hidden by appropriate coverings inside the vehicle. The module 60 according to the invention has many advantages, including:
- a better compactness of the tolerances along the axes X and Y of the fixed window 22 and the upright 62, which is thus more aesthetic.
- an easy mounting of the slide joint 30 in the door 10,
- an easier mounting of the movable window 14 and in particular of its guide 26, the shape of which, with the legs 64, can allow more precise indexing of the window with respect to the door along the axes X and Y,
- a locking of the positioning of the joint 30 and of the window 14 via its guide 26, by the mounting of the trim element 70; this locking could be verified by an operator who would hear the sound associated with the snap-fitting of the trim element 70 on the upright 62,
- the elimination of the defects in the appearance of the upright 62 due to the fact that it can be completely covered and thus hidden by the trim element 70.

The invention claimed is:
1. A window module for a vehicle, in particular an automobile, comprising:
 a fixed window comprising an internal face and an external face, a movable window comprising an internal face and an external face, edges of the windows facing one another and defining a clearance between them, and the external faces of the windows being substantially aligned, an elongated guide extending along said edges and attached to the internal face of the movable window, an elongated upright extending along said edges and attached to the internal face of the fixed window, this upright having in cross-section a general U or L shape, one lateral branch of which extends along and facing said clearance, the upright comprising an external face which faces said internal face of said fixed window and/or said internal face of said movable window, said external face of said upright defining at least partly a housing extending along said edges and intended to receive at least one part of the guide, said upright further comprising an internal face opposite said external face, and a slide joint engaged at least partly in said housing, said slide joint defining a space for receiving said at least one part of the guide, wherein a trim element is fitted and attached to said internal face of the upright, this trim element having an elongated shape and extending along the upright, this trim element comprising at least one retaining member which projects from said external face of the upright and which passes through an orifice of said slide joint, said at least one retaining member comprising a face for retaining said at least one part of the guide in said housing, in a direction substantially perpendicular to a plane which is perpendicular to the internal faces of the windows and which passes through said clearance, and wherein said face of said at least one retaining member extends parallel to the plane and said face abuts against said slide joint.

2. The window module of claim 1, wherein the trim element comprises a plurality of retaining members distributed along at least one portion of the trim element.

3. The window module of claim 1, wherein said at least one retaining member passes through an opening of said upright.

4. The window module according to claim 1, wherein said at least one retaining member bears on an edge of said upright that extends along the edges of the windows.

5. The window module according to claim 1, wherein said trim element comprises at least one hooking tooth on said upright.

6. The window module according to claim 5, wherein said at least one retaining member comprises a hooking tooth, which abuts against said external face of the upright.

7. The window module according to claim 1, wherein said face of said at least one retaining member abuts against said at least one part of the guide.

8. The window module according to claim 1, wherein said face abuts against a wall of the slide joint engaged at least partly in said housing, and said wall of the slide joint abuts against said at least one part of the guide.

9. The window module of claim 8, wherein said at least one retaining member is engaged in a groove of the slide joint.

10. The window module according to claim 1, wherein said slide joint comprises:
at least one lip which is located at a level of said clearance and which abuts against said edges of the windows.

11. The window module according to claim 1, wherein the guide comprises at least one internal leg against which the face or a wall of the slide joint is intended to be in abutment.

12. The window module according to claim 1, wherein the upright extends longitudinally beyond the edge of the fixed window and comprises a part intended to be housed in a casing of a door.

13. The window module according to claim 12, wherein said part of the upright comprises an external face on which are located further protruding retaining members configured to cooperate with said part of the guide and/or said slide joint.

14. A vehicle comprising at least one window module according to claim 1.

15. A method for mounting a window module according to claim 1, wherein the method comprises the steps of:
a) mounting the movable window next to the fixed window, and inserting said part of the guide into the housing of the upright, and
b) mounting the trim element on the upright so that the face of said at least one member engages directly or indirectly with the part of the guide.

16. The method according to claim 15, wherein it comprises, between the steps a) and b), a step i) of mounting the slide joint in the housing of the upright, the part of the guide being engaged in a space for receiving the slide joint during the step b).

17. The method according to claim 16, wherein the part of the guide is inserted by a local elastic deformation of the slide joint during the step i).

18. The method according to claim 16, wherein the upright comprises a part receiving a part of the slide joint and the trim element, and another part receiving another part of the slide joint and intended to extend into a casing of a door.

19. The method according to claim 15, wherein the trim element is attached to the upright by elastic snap-fit.

20. The window module according to claim 1, wherein said slide joint comprises at least one lip in abutment against the internal face of the movable window and at least one lip in abutment against an internal face of the part of the guide.

21. The window module according to claim 1, wherein said upright is made in a non-elastically deformable plastic material and said slide joint is made of an elastically-deformable material.

22. The window module according to claim 1, wherein said upright is attached to the internal face of the fixed window.

23. The window module according to claim 9, wherein the groove has a U, V or trapezoidal cross-section.

24. The window module according to claim 1, wherein said slide joint comprises at least one lip which is located at the level of said clearance and which is in abutment against said edges of the windows.

25. The window module according to claim 11, wherein the guide comprises two internal legs aligned and spaced apart from each other and against which the face or the wall of the slide joint is intended to be in abutment.

26. The window module according to claim 12, wherein said part intended to be housed in the casing of the door comprises at least one leg for attachment to the casing.

27. The window module according to claim 1, wherein said trim element is an aesthetic trim element and is suitable to be visible by a user of the vehicle.

* * * * *